United States Patent [19]

Manning

[11] Patent Number: 4,743,084
[45] Date of Patent: May 10, 1988

[54] OPTICAL FIBER CONNECTOR FOR FIELD APPLICATION

[75] Inventor: Randy M. Manning, New Cumberland, Pa.

[73] Assignee: AMP Incorporated, Harrisburg, Pa.

[21] Appl. No.: 863,224

[22] Filed: May 14, 1986

[51] Int. Cl.⁴ .............................................. G02B 6/38
[52] U.S. Cl. .............................. 350/96.21; 350/96.10
[58] Field of Search ................. 350/96.20, 96.21, 96.22

[56] References Cited

U.S. PATENT DOCUMENTS

| | | | |
|---|---|---|---|
| 4,080,044 | 3/1978 | Gousseau | 350/96.21 |
| 4,133,601 | 1/1979 | Le Guen et al. | 350/96.21 |
| 4,185,883 | 1/1980 | Chown et al. | 350/96.20 |
| 4,190,317 | 2/1980 | Makuch | 350/96.20 |
| 4,435,038 | 3/1984 | Soes et al. | 350/96.20 |
| 4,447,121 | 5/1984 | Cooper et al. | 350/96.20 |
| 4,487,474 | 12/1984 | Nishie et al. | 350/96.20 |
| 4,519,672 | 5/1985 | Rogstadius | 350/96.21 X |

FOREIGN PATENT DOCUMENTS

| | | |
|---|---|---|
| 0026139 | 4/1981 | European Pat. Off. . |
| 56-47017 | 7/1981 | Japan . |
| 56-165109 | 12/1981 | Japan . |
| 58-171016 | 10/1983 | Japan . |
| 58-182608 | 4/1987 | Japan . |
| 8600423 | 1/1986 | PCT Int'l Appl. . |
| 2045454 | 10/1980 | United Kingdom . |

OTHER PUBLICATIONS

*Technology News*, EDN Aug. 20, 1980, Tom Ormond, Sr. Editor, "Fiber Connectoring/Splicing Techniques Promise to Solve Cost, Handling Problems", pp. 35–37.
IBM Technical Disclosure Bulletin, vol. 22, No. 10, Mar. 1980, p. 4475.

*Primary Examiner*—William L. Sikes
*Assistant Examiner*—Akm E. Ullah
*Attorney, Agent, or Firm*—Gerald K. Kita

[57] ABSTRACT

An optical connector (1) comprises, a rigid body (2) with an axial bore (3), a sleeve (7) surrounding the rigid body (2) and having a sleeve section (9), a deformable means (10) in the sleeve section (9) and having an axial passage (11) aligned with the bore (3), an optical waveguide (14) secured in the bore (3) and having a first optical face and a second optical face, the axial passage (11) and the sleeve section (9) having open ends (18,19) to admit an optical fiber (22) in concentric alignment with the waveguide (14), and the deformable means (10) constructed for radial reduction of the passage (11) to grip the optical fiber (22).

11 Claims, 3 Drawing Sheets

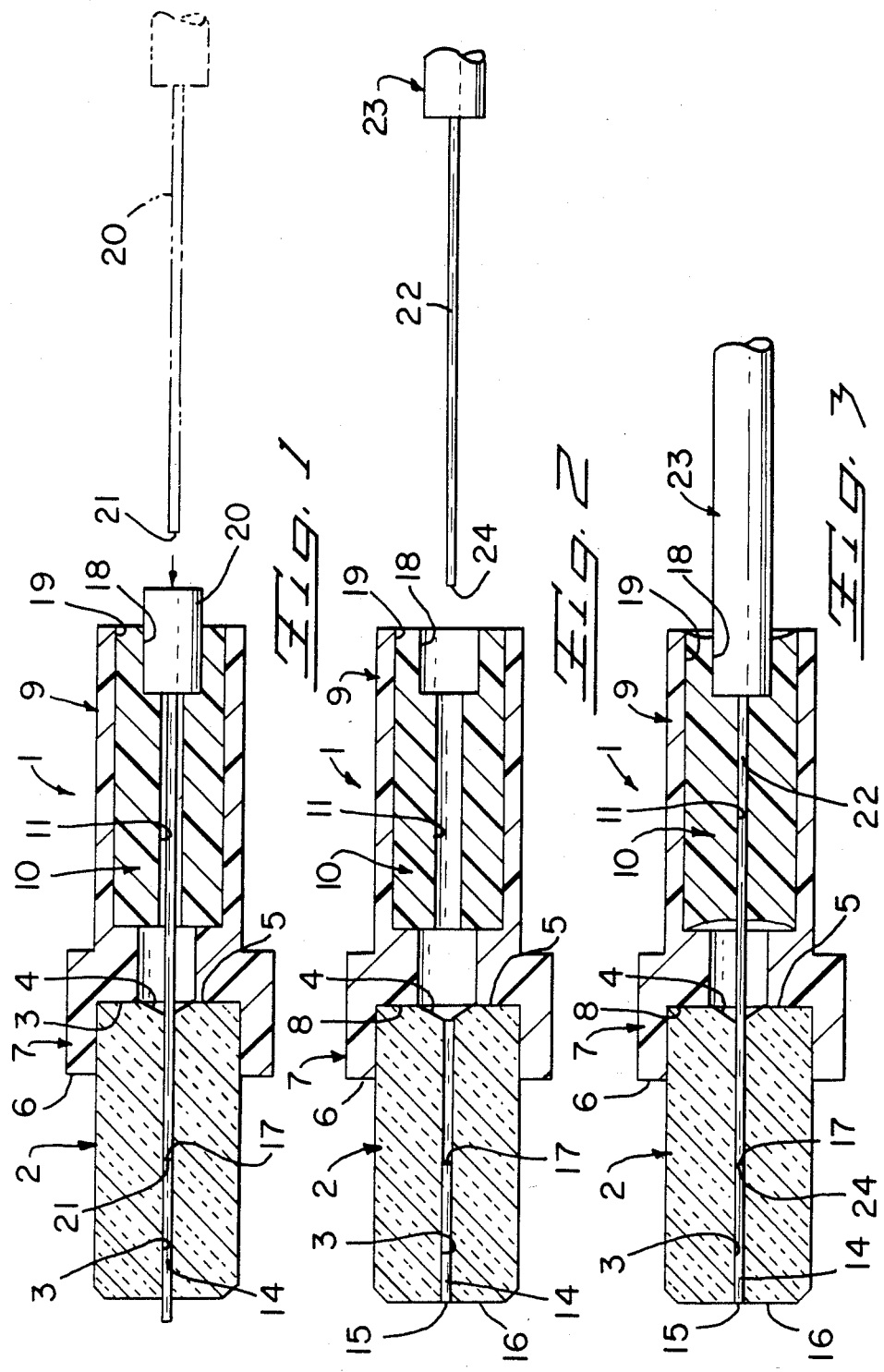

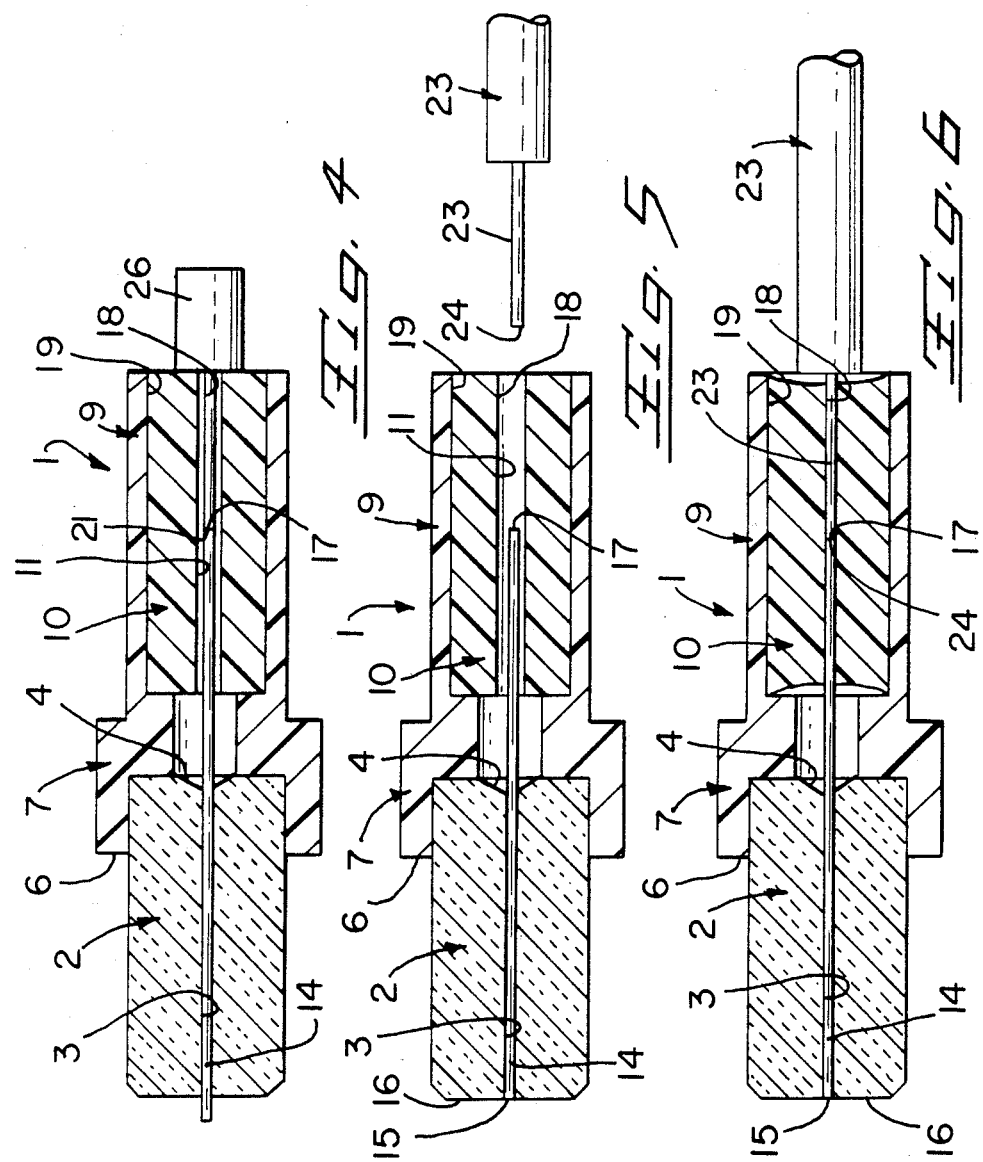

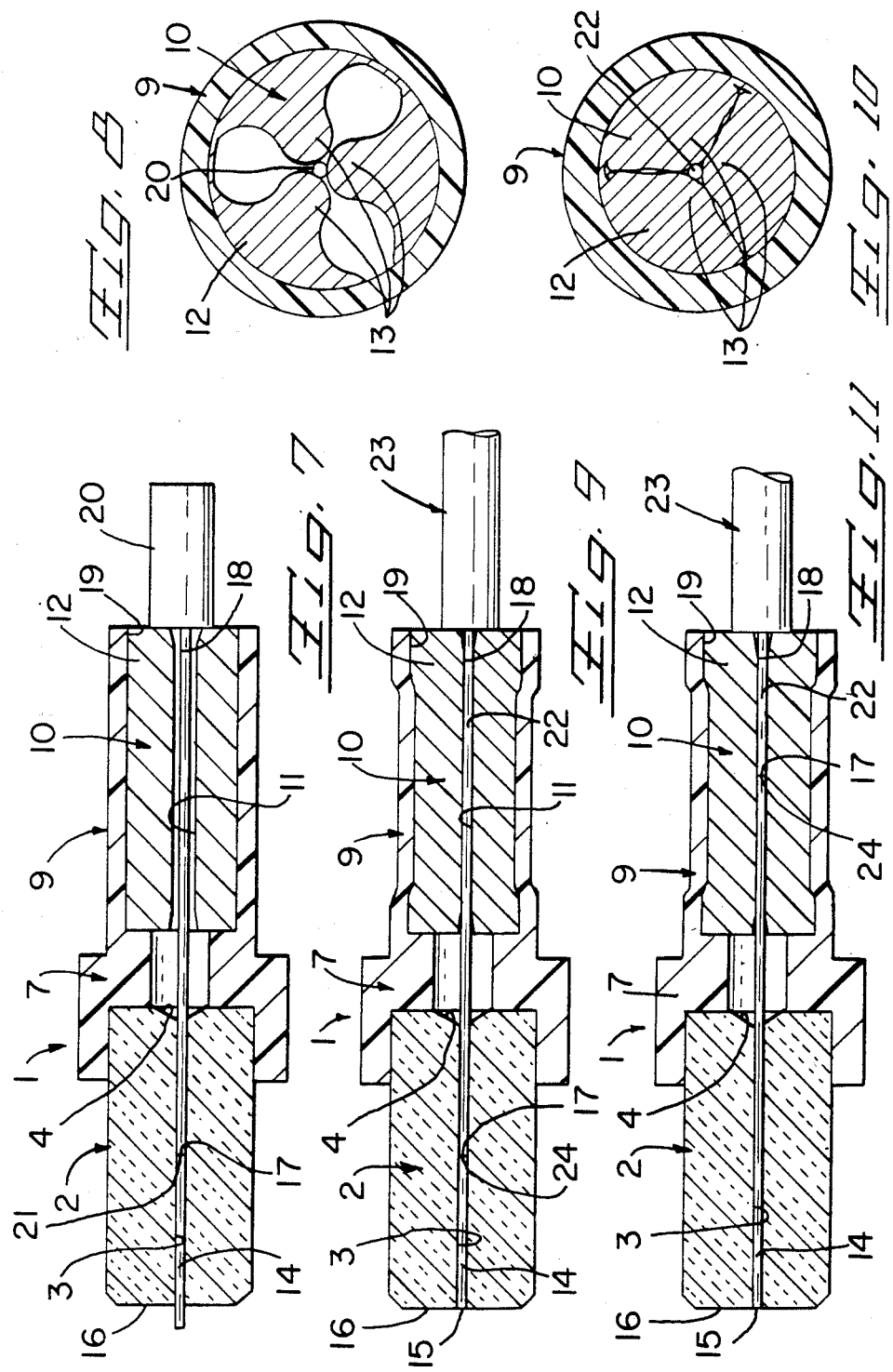

OPTICAL FIBER CONNECTOR FOR FIELD APPLICATION

FIELD OF THE INVENTION

The invention is directed to an optical connector for optical fibers, and, more particularly, to an optical connector for application to an optical fiber of an optical cable by mechanical means and without the use of an adhesive.

BACKGROUND OF THE INVENTION

In an optical communications system, communications signals are transported by an optical carrier wave. An optical fiber of the communications system confines the optical carrier wave and routes the optical carrier wave from one item of optical equipment in the system to another item in the system. The optical fiber is a solid filament of conspicuously small size. For example, the filament is as slender as a human hair. The optical carrier wave propagates into one end of the optical fiber. Each end of the slender optical fiber must be carefully prepared with an optical face to avoid undesired reflection or dispersion of the wave from its intended path of propagation. Each optical face is supported by a corresponding optical connector that is useful for coupling the optical fiber with an item of optical equipment or with another optical fiber. Due to the fragile nature of the slender optical fiber, considerable care must be exercised during application of the optical connector to the optical fiber. The application is often performed in a laboratory environment or factory environment conducive to successful application.

SUMMARY OF THE INVENTION

The invention fulfills a need for an optical connector that is suitable for application to an optical fiber. Several known procedures are followed during application of an optical connector to an optical fiber. First an optical face is provided on the end of the fiber, either by polishing an end of the fiber, or by carefully propagating a fracture through the cross section of the fiber to produce a "cleaved" end. The cleaved end or polished end of the fiber becomes the optical face. The optical face assures that an optical carrier wave will emanate through the optical face with only limited reflection or scattering of the wave from its intended path of propagation.

The known procedure further utilizes an optical connector to align the optical face of the fiber concentrically within the connector and axially along the connector. Application of the connector is a painstaking procedure and yet is necessary to assure that the optical fiber is adapted with the connector for precise coupling by way of its optical face to an item of optical equipment, for example, another optical connector that has been applied to a corresponding optical fiber. The known procedure further requires an adhesive or a mechanical grip, which must be applied to the optical fiber without disturbing its alignment with the applied connector.

In practice, the application of an optical connector to an optical fiber is difficult to accomplish. Adhesives are known and are used to secure an optical connector and an optical fiber together. A disadvantage of an adhesive results from a lengthy time required for the adhesive to solidify and form a permanent bond. During the passage of time required for solidification, the optical fiber is vulnerable to mishaps that could disrupt the alignment of the optical fiber with respect to the connector.

Mechanisms are known and are used for establishing a mechanical grip on an optical fiber by an optical connector. The known mechanisms have a common disadvantage of being fabricated from an assembly of component parts of small size that are costly to manufacture and difficult to manipulate. Moreover, such parts are easily lost due to their small size.

Because of these described difficulties, the assembly of an optical connector to an optical fiber is a delicate operation best performed in a laboratory environment or a factory environment. The assembly operation is even more difficult to perform under field conditions. By field conditions is meant the conditions of an environment that are not especially adapted for performance of the assembly operation. Field conditions could include, for example, weather conditions, presence of airborne or surface contaminants or an awkward or inhospitable place for human performance of such operations.

Because of these described difficulties, there exists a need for an optical connector that is capable of application to an optical fiber under field conditions, and yet meet the requirements of small size and low cost.

Advantages of the invention reside in an optical connector with its component parts fully assembled in a factory environment prior to its application to an optical fiber. Assembled parts are less subject to loss and are adapted for application quickly to an optical fiber, especially under field conditions.

Advantages of the invention reside in an optical connector having component parts comprising, a short length of optical waveguide with optical faces on its ends and assembled in an interior of the connector, and another component part adapted for receiving an optical fiber under field conditions, and for guiding the received fiber into alignment with the component waveguide, and which is capable of radial reduction to grip the received fiber, whereby the received fiber is aligned in the connector and is secured to the connector without the addition of an adhesive.

According to the principles of the invention, an optical connector has a sleeve means in which is mounted a rigid body and a radially deformable means, an optical waveguide assembled in the rigid body, and the radially deformable means and the sleeve means have open ends to admit an optical fiber in alignment with the waveguide, and the radially deformable means is adapted for radial reduction to grip the optical fiber.

Accordingly, an object of the invention is to provide an optical connector of small size and low cost, capable of application to an optical fiber without adhesive, and capable of application to an optical fiber under field conditions.

Another object is to provide an optical connector for an optical fiber having sleeve means in which is mounted a rigid body and a radially deformable means, an optical waveguide mounted in the rigid body, the radially deformable means and the sleeve means having open ends to admit an optical fiber in alignment with the waveguide, and the radially deformable means being constructed for radial reduction to grip the optical fiber.

Another object of the invention is to provide an optical connector of small size and low cost and comprised of component parts fully assembled in a factory environment to avoid their being lost.

Other objects and advantages of the invention will be apparent, by way of example, from a detailed description that follows and from accompanying drawings, together which disclose, by way of example, embodiments of the invention.

BRIEF DESCRIPTION OF THE DRAWINGS

In the drawings,

FIG. 1 is an enlarged sectional view taken longitudinally of an optical connector and its component parts and a tool used during assembly of a waveguide component part.

FIG. 2 is a view similar to FIG. 1, illustrating field assembly of the optical connector to an optical fiber.

FIG. 3 is a view similar to FIG. 2, illustrating the optical connector and the optical fiber secured together by radially deformable means of the connector.

FIG. 4 is an enlarged sectional view taken longitudinally of an optical connector and its component parts, including a solid waveguide as one of its component parts.

FIG. 5 is a view similar to FIG. 4, illustrating field assembly of the optical connector of FIG. 4 to an optical fiber.

FIG. 6 is a view similar to FIG. 5, illustrating the optical connector of FIG. 5 and the optical fiber secured together by radially deformable means of the connector.

FIG. 7 is an enlarged sectional view taken longitudinally of an optical connector and its component parts and a tool used during assembly of a waveguide component part.

FIG. 8 is an enlarged view of a section taken along line 8—8 of FIG. 7 to illustrate a radially deformable means of the connector shown in FIG. 7.

FIG. 9 is a view similar to FIG. 7, illustrating field assembly of the optical connector to an optical fiber.

FIG. 10 is an enlarged view of a section taken along line 10—10 of FIG. 9 to illustrate radial reduction of the radially deformable means.

FIG. 11 is an enlarged sectional view taken longitudinally of an optical connector including a solid waveguide as one of its component parts, and illustrated as applied to an optical fiber.

DETAILED DESCRIPTION

With more particular reference to the drawings, FIGS. 1 through 3 disclose a corresponding optical connector 1. FIGS. 3 through 6 disclose another corresponding optical connector 1. FIGS. 7 through 10 disclose another corresponding optical connector 1. FIG. 11 discloses another corresponding optical connector 1. The corresponding optical connectors 1, 1, 1, 1 will have similar component parts. The similar component parts will appear in different figures of the drawings and will be described with the same numerals.

Each corresponding optical connector 1 includes a rigid alignment ferrule in the form of a rigid body 2 with an axial bore 3. Ceramic material is suitable for formation of the bore diameter to within a micron dimensional tolerance. Another suitable body is formed by a glass tube that is hot drawn to a reduced diameter thus forming a capillary having a bore of reduced diameter. An enlarged counterbore 4 is recessed in one end 5 of the body 2, and is concentrically aligned with the bore 3 to define an enlarged entrance 4 for the bore 3, and is tapered like a funnel to guide an optical fiber into the end of the bore 3.

The body 2 projects from the interior of a first end 6 of a rigid sleeve 7, of metal or other suitable material, which has an internal shoulder 8 against which the end 5 of the body engages and seats. For example, the body 2 is press fit in the sleeve 7 and is secured in the sleeve 7 by a friction fit. Alternatively, the body 2 may be secured by adhesive, or alternatively, the body 2 is made from a conductive ceramic material such as alumina and is secured in the sleeve 7 by solder (not shown). The sleeve 7 has a sleeve section 9 projecting beyond the end of the body 2. Fabrication of the body 2 and sleeve 7 is readily accomplished by use of the composite parts as described. The body 2 and sleeve 7 can be a unitary metal part. However, the bore 2 can be difficult to form in metal.

In the sleeve section 9 is secured radially deformable means 10 in the form of a shape memory material, also known as a dimensionally unstable material mass, having an axial stepped diameter passage 11 aligned axially colinearly with the bore 3 and the counterbore 4 of the rigid body 2. A more complete disclosure of suitable materials and construction of the radially deformable means 10 is contained in U.S. Pat. No. 4,178,067, issued Dec. 11, 1979.

Alternatively in the sleeve section 9 of FIGS. 7-10 and of FIG. 11 is secured radially deformable means 10 in the form of a support body 12 forming three elongated members 13, 13, 13 of deformable material, and being of circular overall cross section to be received in the sleeve section 9, and defining a central passage 11 aligned colinearly with the bore 3 and the counterbore 4 of the rigid body 2. Further details of the support body 12 are disclosed in U.S. Pat. No. 4,435,038, issued Mar. 6, 1984.

An optical waveguide 14 is secured in the bore 3 of the rigid body 2 and has a first optical face 15 positioned at a free end 16 of the rigid body 2, and has a second optical face 17 aligned with the axial passage 11 of the radially deformable means 10. The second optical face 17 is positioned within the interior of the bore 3 recessed from the enlarged entrance 4 (FIGS. 1 through 3, 7 and 9) or, alternatively, the second optical face 17 is within the passage 11 of the radially deformable means 10 when the waveguide 14 projects outwardly of the rigid body 2 (FIGS. 4 through 6 and 11).

The waveguide 14 shown in any of the FIGS. 1 through 7 and 9 through 11 can be a solid waveguide 14, for example, a mass of solid, light transmissible material or an optical fiber. The optical face 17 is provided by polishing or by cleaving one end of the solid waveguide 14. The other end of the solid waveguide 14 is inserted in and along the open ends 18 and 19 of the axial passage 11 and the sleeve section 9. The solid waveguide 14 is then inserted along the passage 11 and the bore 3 of the rigid body 2, with the enlarged entrance 4 of the bore 3 guiding the transfer of the solid waveguide 14 from the passage 11 to the bore 3. A push rod 20 abuts the optical face 17 of the solid waveguide 14 and is used to urge the solid waveguide 14 along the passage 3 until the optical face 17 is in alignment with the passage 11, and either within the passage 11 of the radially deformable means 10 or within the bore 3 of the rigid body 2. The solid waveguide 14 is then secured in the bore 3 by an adhesive, not shown. Once the solid waveguide 14 is secured, the push rod 20 is removed, and the other optical face 15 is provided by polishing an end 15 of the solid waveguide 14, which finishes the end 15 of the waveguide 14, either flush with or slightly recessed from the free end 16 of the rigid body 2.

The waveguide 14 shown in FIGS. 1 through 3 and in FIGS. 7 and 9, can be an optically transmissive substance 14 deposited and solidified in the bore 3, and secured by adhesion to the interior of the rigid body 2. The substance 14 is selected with an index of optical refraction that matches that of an optical fiber to which the connector 1 is applied. Further details of an optically transmissive substance within a bore are disclosed in U.S. Pat. No. 4,186,999, issued Feb. 5, 1980. The push rod 20 serves as a removable plug 20, an end 21 of which is positioned in the bore 3 of the rigid body 2. The deposited material 14 fills the interior of the bore 3 that extends between the end 21 of the plug 20 and the free end 16 of the rigid body 2. The end 21 of the plug 20 shapes the second optical face 17 within the bore 3, and thereafter is removed from the connector 1.

The passage 11 and the sleeve section 9 have open ends 18 and 19 to admit an optical fiber 22 and an optical cable 23 that is to be assembled with the optical connector 1. The fiber 22 of the optical cable 23 is first prepared by exposing a length of the fiber 23 from the remainder of the cable 22. Then a distal end 24 of the fiber 22 is finished with an optical face 24, either by polishing or by a controlled fracture through the cross section of the fiber 22. The fiber 22 is inserted through the open ends 18, 19 of the axial passage 11 and the sleeve section 9. The fiber 22 is then inserted along the passage 11 and then along the bore 3 of the rigid body 2, with the enlarged entrance 4 of the bore 3 guiding the transfer of the fiber 22 from the passage to the bore 3 (FIGS. 1 through 3, 7 and 9). The optical face 24 of the fiber 22 is abutted against the second optical face 17 of the optical waveguide 14. The bore 3 aligns the optical faces 17, 24 of the waveguide 14 and the fiber 22 in colinear alignment. The radially deformable means 10 is constructed for radial reduction of the axial passage 11, according to procedures disclosed in the aforementioned patents, thereby to grip and secure the fiber 22 in the passage 11 as shown in FIGS. 3, 6, 10 and 11. Alternatively, if the waveguide 14 projects into the passage 11, the second optical face 17 of the waveguide 14 is in the passage 11 (FIGS. 4 through 6 and 10). The fiber 22 then is inserted along the passage 11 until it abuts against the second optical face 17. Upon radial reduction of the axial passage 11, the radially deformable means 10 will grip the waveguide 14 and the fiber 22 and the radially reduced passage 11 will maintain colinear alignment of the optical faces 17, 24, of the waveguide 17 and the fiber 22.

I claim:

1. A connector comprising,
  a rigid body with an axial bore,
  a sleeve encircling the rigid body and having an integral sleeve section projecting beyond a rear end of the rigid body,
  radially deformable means encircled concentrically by the sleeve section and having an axial passageway aligned with the bore,
  an enlarged entrance of the bore recessed in an end of the rigid body and positioned in alignment with the passage,
  an optical waveguide secured in the bore of the rigid body and having a first optical face positioned at a front end of the rigid body, and having a second optical face in the connector aligned with the axial passage of the radially deformable means,
  the axial passage and the sleeve section having open ends to admit an optical fiber having a distal end finished with an optical face positioned in colinear alignment with the second optical face of the waveguide, and
  the radially deformable means being fabricated of a shape memory material constructed for radial reduction of the passage by shape memory reduction to grip an optical fiber admitted in the passage.

2. A connector as recited in claim 1, wherein, the waveguide is a solidified and optically transmissive material adhered to the rigid body.

3. A connector as recited in claim 1, wherein, the waveguide is an optical fiber having a first end finished with the first recited optical face, and having a second end finished with the second recited optical face.

4. A connector as recited in claim 1, 2 or 3, wherein, the second optical face is in the interior of the bore of the rigid body and axially recessed from the enlarged entrance of the bore.

5. A connector as recited in claim 1 or 3, wherein, the waveguide projects outwardly of the rigid body and the second optical face is within the axial passage of the radially deformable means.

6. A connector as recited in claim 1, 2 or 3, wherein, the passageway has an open end receiving the end of an optical cable.

7. A connector comprising,
  a rigid body with an axial bore,
  a sleeve encircling the rigid body and having an integral and deformable sleeve section projecting beyond a rear end of the rigid body,
  radially deformable means encircled concentrically by the sleeve section and having an axial passageway aligned with the bore,
  an enlarged entrance of the bore recessed in an end of the rigid body and positioned in alignment with the passage,
  an optical waveguide secured in the bore of the rigid body and having a first optical face positioned at a front end of the rigid body, and having a second optical face in the connector aligned with the axial passage of the radially deformable means,
  the axial passage and the sleeve section having open ends to admit an optical fiber having a distal end finished with an optical face positioned in colinear alignment with the second optical face of the waveguide, and
  the sleeve section and the radially deformable means being deformable for radial reduction of the passage to grip an optical fiber admitted in the passage.

8. A connector as recited in claim 7, wherein, the waveguide is a solidified and optically transmissive material.

9. A connector as recited in claim 7, wherein, the waveguide is an optical fiber having a first end finished with the first recited optical face, and having a second end finished with the second recited optical face.

10. A connector as recited in claim 7, 8, or 9, wherein, the second optical face is in the interior of the bore of the rigid body and axially recessed from the enlarged entrance of the bore.

11. A connector as recited in claim 7 or 9, wherein, the waveguide projects outwardly of the rigid body and the second optical face is within the axial passage of the radially deformable means.

* * * * *